Nov. 27, 1962    J. B. HERSEY ETAL    3,065,815
METHOD AND APPARATUS FOR SURVEYING WATER-COVERED AREAS
Filed Dec. 24, 1957    2 Sheets-Sheet 1
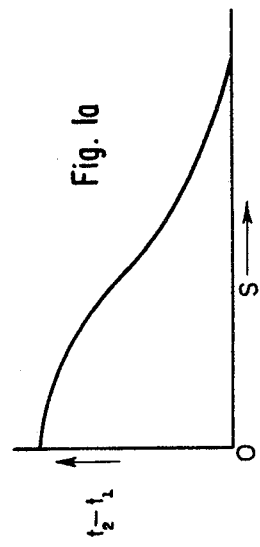
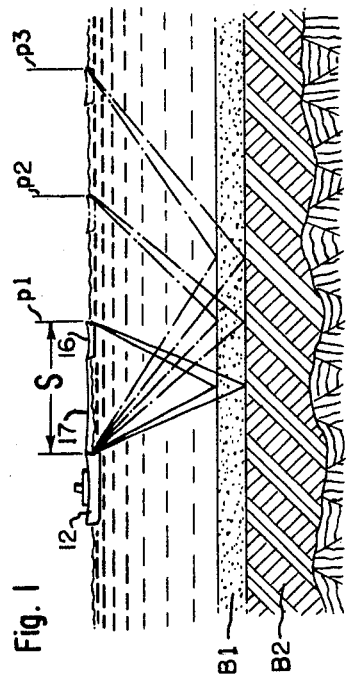
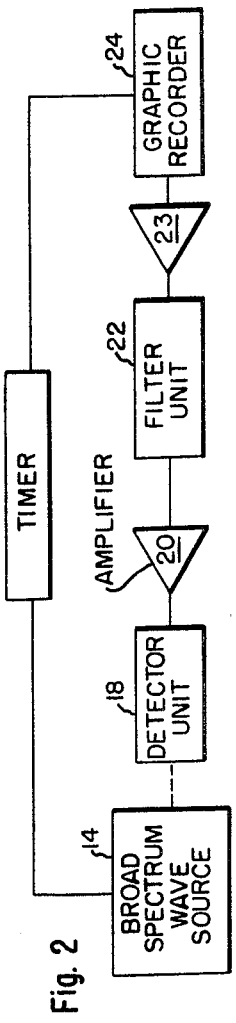
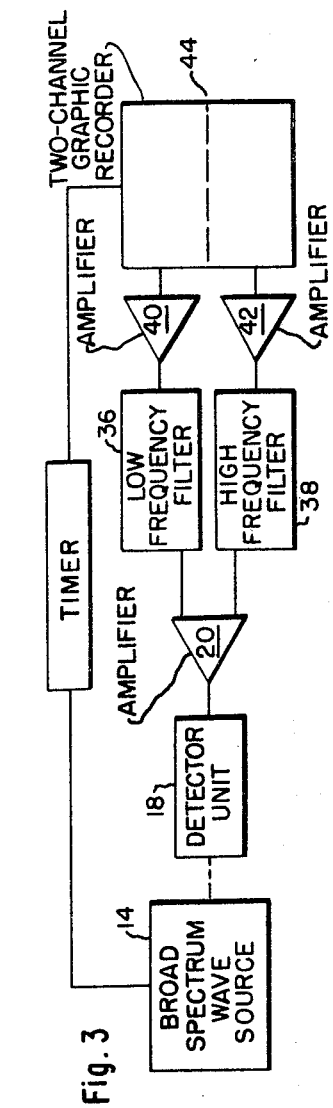
INVENTORS
JOHN B. HERSEY
SYDNEY T. KNOTT
BY
KENWAY, JENNEY, WITTER & HILDRETH
ATTORNEYS

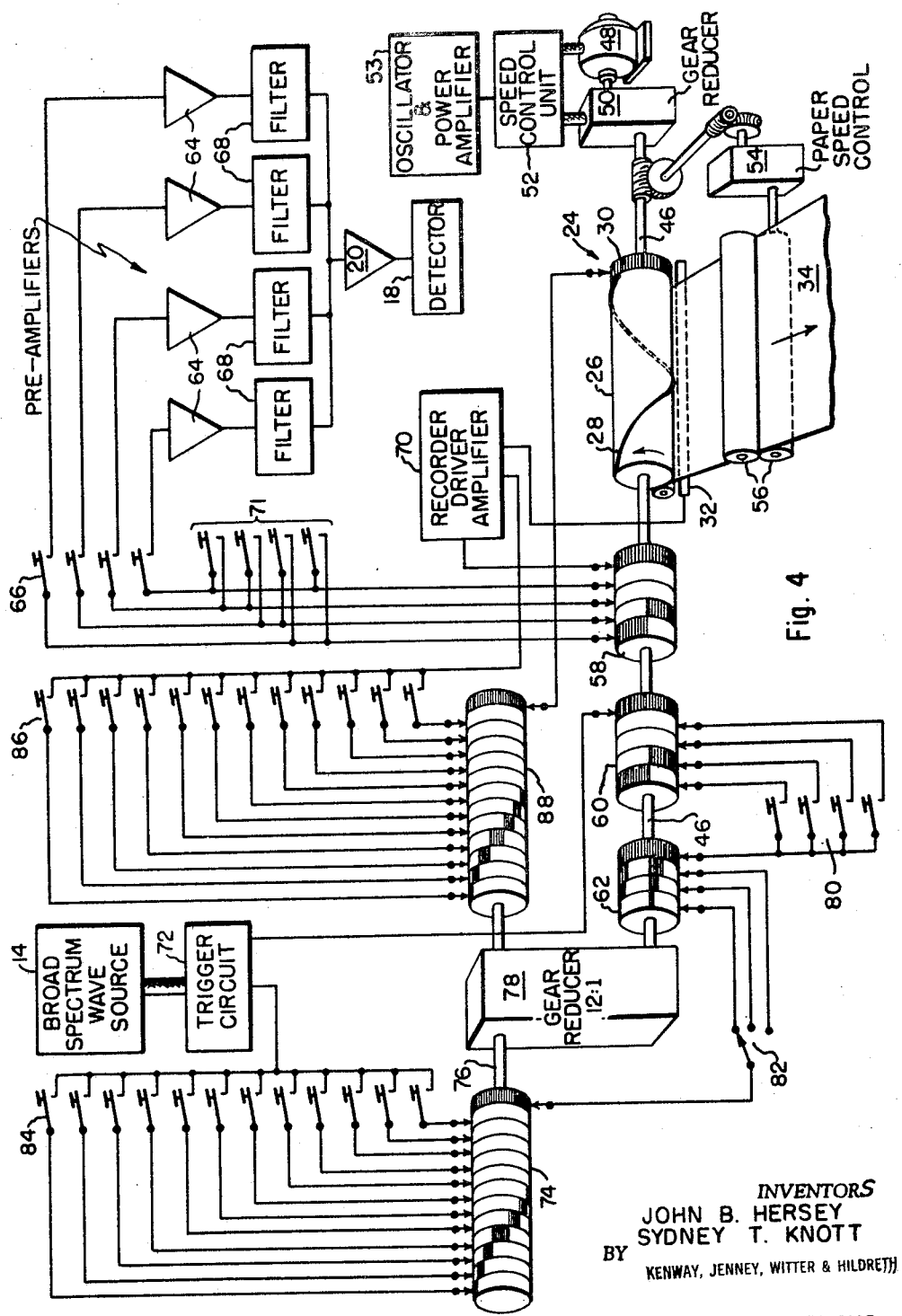

United States Patent Office 3,065,815
Patented Nov. 27, 1962

3,065,815
METHOD AND APPARATUS FOR SURVEYING
WATER-COVERED AREAS
John B. Hersey, Woods Hole, and Sydney T. Knott, Barnstable, Mass., assignors to Woods Hole Oceanographic Institution, Woods Hole, Mass., a corporation of Massachusetts
Filed Dec. 24, 1957, Ser. No. 705,067
5 Claims. (Cl. 181—.5)

The present invention relates generally to methods and instruments for surveying sub-bottom strata in water-covered areas. More particularly, it relates to an instrument suitable for surveying sub-bottom geological structures in small detail, and to a method for using such an instrument.

The invention has for its principal object the provision of means to ascertain the character and measure the profiles and dimensions of sub-bottom strata which are significant to civil engineering operations. For such purposes the measurements should be accurate to within a few feet, and should be useful within one or two feet of the bottom. Also, many reliable measurements should be obtainable in succession at closely spaced intervals in the area to be surveyed.

In the past, resort has frequently been had to the tedious and costly method of drilling the bottom and examining the character of the drillings at various depths. This is obviously impracticable for mapping areas of substantial size. Accordingly, a second object is to provide means operable from near the water surface whereby free mobility over the area to be surveyed is possible.

Hitherto, methods and apparatus for seismic measurement and depth sounding have been developed upon the principle that when elastic waves are emitted from a source they may be reflected from or refracted through the bottom or sub-bottom strata to a receiver and the dimensions and distances traversed may be ascertained from the time required for the waves to reach the receiver which may be placed in predetermined relation to the wave source. Recording instruments for timing the waves in conventional apparatus may take various forms, and in the case of depth sounding the graphic recorder has been extensively used. Its operation is well understood in the art as applied to a study of the bottom or floor of a water-covered area.

Seismic methods are of two well-known basic types, both of which commonly employ explosives as sources of elastic waves. The first, or reflection, type involves a source of frequencies low enough to penetrate the bottom and a receiver close to the source. The second, or refraction, type involves a source and a receiver which are necessarily widely spaced, for example one-half mile apart, in order to cause elastic waves emitted from the source to be directed along the sub-bottom horizons of interest an adequate distance to measure their velocity. These methods are inadequate to satisfy the objects of this invention for several reasons. The use of explosives does not permit the rapid obtaining of measurements taken from closely spaced positions to provide a profile having sufficient detail for many civil engineering purposes. Further, the refraction method requires adequate space to be carried out, which may not be available in waters of civil engineering interest.

Depth sounding methods commonly do not employ explosives, but the sources of elastic waves are usually limited to single frequencies. The frequencies used are ordinarily too high to penetrate the bottom usefully.

Further objects of this invention are to utilize elastic waves in attaining the above objects, and to adapt the graphic recorder to represent the data which are significant thereto in a form suitable for correlation of reflections from sub-bottom strata.

With the above and other objects in view, the features of the invention include the provision of a source of pulses of elastic waves of wide frequency range, in combination with receiving equipment including a hydrophone located near the water surface, a broad band receiver, frequency selective filter means for selecting a frequency interval which permits the best representation of the desired data, and means for recording the received pulses.

According to another feature, the time-scale representations recorded from these pulses are converted to depth-scale values by a "velocity run" in which the velocity of the waves in each medium or stratum of interest is accurately measured. In this procedure, while either the source or the hydrophone is located in fixed position, they are gradually moved apart and pulses are sent out on a regular schedule. The reflections received at the hydrophone are recorded on a graphic recorder. The transit times of the reflections are related to the displacements of the hydrophone from the source when the pulses are received to obtain the velocity values for each stratum.

Another feature of the invention resides in providing data for correlation techniques applied to the survey record, these techniques being useful in eliminating spurious recorded reflections.

Other features reside in certain details of the method and in the adaptations, structures, arrangements of the apparatus and modes of operation which will be more clearly understood from the forms thereof as hereinafter described, having reference to the appended drawings illustrating the same.

In the drawings, FIG. 1 is a diagrammatic view illustrating a "velocity run."

FIG. 1a is a graph showing transit time relationships in a "velocity run";

FIG. 2 is a block diagram of a simplified form of the surveying apparatus;

FIG. 3 is a block diagram of a more complex form of the surveying apparatus; and FIG. 4 is a view in schematic form of a preferred form of the invention showing timing relationships of the parts of the instrument in its preferred form.

*General Description*

Referring to FIGS. 1 and 2, the surveying equipment according to this invention is preferably carried by a ship 12, and includes an elastic wave source 14. A float 16 carries a detector 18 with a broad frequency response and which may be a hydrophone of the type commonly used in seismic measurements in water-covered areas. The float 16 is hauled by a line 17 which may be drawn up to position the detector within a few feet of the source, or paid out at a uniform measurable speed to a distance of a few hundred feet.

The source 14 is of small dimensions and is characterized by an output of very broad frequency spectrum, as distinguished from the high frequency, narrow band sources commonly employed in depth sounding. Another characteristic of the source is its adaptability to a high rate of pulse repetition, for example, of the order of four to eight uniform pulses per second. The source should also be capable of emitting short pulses of the order of $0.1 \times 10^{-3}$ second at an energy level preferably at or above 70 decibels referred to one dyne per square centimeter. The triggering apparatus for the source should also have an accurately repeatable time lag of the pulse following initiation by a timing mechanism. The preferred source is of the familiar spark type, providing a high voltage discharge between a pair of electrodes submerged a few feet below the water surface. Sources of this type are useful for various researches in underwater sound and a description of a typical form is found in an article entitled "Electronics in Oceanography" in Advances in Electronics and Electron Physics, volume 9, published by Academic Press in 1957.

The detector hydrophone 18 is connected to a broad band amplifier 20 which preferably has a flat response characteristic from about 50 to 20,000 c.p.s. and a dynamic range of 120 decibels. In the simplified form of FIG. 2 the amplifier is connected to a band pass filter 22 of variable band width which is continuously adjustable between 50 to 20,000 c.p.s. In operation, adjustment is made as a function of the strata under study, in a manner hereinafter more fully described.

The filter 22 is connected through an amplifier 23 to a graphic recorder 24 such as is frequently used in depth sounding apparatus. The general construction of the recorder is illustrated in FIG. 4, and includes a drum 26 having a helical wire 28 wound over it. The wire 28 is connected with a slip ring 30 and is revolved over a stationary staright edge 32. A web of recording paper 34 is fed at uniform speed between the helix and the straight edge. "Writing" is accomplished by applying an electrical potential between the helix and the straight edge to create a current flow through the paper which is constructed or sensitized to exhibit a mark of a density corresponding to the value of the applied electric current. The position of the mark transversely of the web is a function of the position of the helix in its revolution. Following common practice in the echo sounder art, the source 14 sends out pulses which are timed by the position of the helix drum. Commonly, these pulses are initiated at an instant which corresponds to a position near an edge of the web and a reflection from the deepest horizon is recorded within the following revolution of the helix.

As is well understood in the art, the sound waves emanating from a spark source bear various angles to the vertical. Some of these waves strike submerged surfaces at angles of incidence which cause reflections to the hydrophone, while the reflections from other surfaces are not detected. The problems in any case are to locate the direction from the source of a surface causing a recorded reflection, and to measure the depth to the reflecting surface. The echo pulse is detected by a mark displaced on the web 34 from the direct source-to-detector wave by a distance directly proportional to the transit time to the reflector and back to the hydrophone. The conversion of this distance to a scale of length is accomplished by means of a "velocity run" hereinafter more fully described. The location of the direction of a reflecting surface from the source is accomplished by correlating numerous recorded reflections from closely adjacent positions as further described below.

The block diagram of FIG. 3 is similar to that of FIG. 2 with respect to the source 14, the detector 18 and the amplifier 20. These elements are similarly numbered in both figures. However, the single, adjustable filter 22 is replaced by a low frequency filter 36 and a high frequency filter 38, these filters being selectable for use either alternatively or simultaneously. Following each filter an amplifier 40 or 42 is connected to a separate channel of a multi-channel graphic recorder 44. The channels may each have separate helix wires such as 28 on the recorder. Alternatively, both channels may be connected to the same helix; or, the channels may share time on the same helix. This latter alternative is specifically illustrated and described below with reference to FIG. 4.

The uses of multi-channel recording relate primarily to the problem of locating reflecting surfaces and are described below in that connection.

*Velocity Run*

The "velocity run" previously referred to is accomplished over an area where the bottom and all horizons of interest have been found by previous exploration to be substantially flat and horizontal. The method is basically comparable to that used in seismography for oil and mineral exploration to obtain the velocity of elastic waves in buried strata on land, but the selected frequencies necessarily fall generally above the 20 to 200 cycle per second range used in established exploration practice. With either the ship 12 or the float 16 at anchor, they are propelled or drifted apart at a uniform speed, for example 4 to 10 feet per second until the separation is several hundred feet, for example 500 to 1,000 feet. While this motion continues the source 14 is caused to emit pulses on a regular schedule at a rapid rate of, say, four to eight per second. Since the bottom is horizontal a reflection therefrom will be the first received following the direct wave from source to detector. The velocity of elastic waves in the water is computed from separately measured physical characteristics of the water, principally temperature and salinity. (See, for example, Mathews, D. J., "Tables of the Velocity of Sound in Pure Water and Sea Water for Use in Echo Sounding and Sound Ranging," published by the Hydrographic Department, Admiralty, London (1939).)

By proper adjustment of the filter or filters, echos may be detected from lower horizons to which waves of lower frequency have penetrated. These waves have travelled through two or more media, and a well-known method of approximations may be applied to determine the velocity in each medium. See, for example, Officer, C. B., "A Deep-Sea Seismic Reflection Profile," published in Geophysics, vol. 20, No. 2, page 270 (1955). In this method, account is taken of the fact that, as the float 16 moves from position P1 through P2 to P3 (FIG. 1), the distance travelled in a stratum B1 by a wave increases although the stratum is assumed to be of uniform depth. Also, as shown in FIG. 1a the difference $t_2-t_1$, between the travel time $t_2$ of a pulse reflected from the horizon between strata B1 and B2 and the travel time $t_1$ of a pulse reflected from the bottom, varies in a characteristic, experimentally-determined manner with respect to the distance $s$ from source to detector. The method consists in making several estimates of the velocity in the stratum B1, computing curves similar to FIG. 1a for each estimated velocity, comparing each of the computed curves with the experimentally-determined curve, and repeating the process until a best fit is obtained. The velocities of deeper strata may be determined by a simple extension of this same method.

*Obtaining the Survey Record*

Having determined the velocity of the waves in each stratum, neighboring regions of sharp surface irregularity may be explored with accuracy, the distance transversely of the web 34 being scaled directly in feet or other convenient units of length obtained from the "velocity run." The record thus obtained may be termed the "survey record." In general, the procedure is to vary the range of the filter or filters to secure the clearest obtainable reflections from the horizons of interest, for example the intefaces between the bottom, a layer of mud, a layer of sand and gravel, and bedrock. The float 16 is hauled up as close as possible to the ship 12 to bring the detector 18 to within a few feet of the source 14, preferably less than 10 feet, whereby the recorded reflections are largely restricted to those from pulses which strike the reflecting surfaces substantially at right angles. With the detector 18 and the source 14 held in fixed position relative to the ship, the ship is propelled at a uniform slow rate of 4 to 10 feet per second and pulses are sent out at a uniform rate to 1 to 8 per second. In general, the best frequency for study is the highest that will penetrate to the deepest horizon and yield an echo discernable from the echoes of adjacent horizons, since frequencies lower than this would produce less precise vertical definition in accordance with well-understood principles.

Analysis of the record thus obtained is accomplished by one or more methods depending on the character of the reflecting surfaces being surveyed. As is common in echo sounding, many spurious reflections are received, for example from marine life and non-representative topographical features. Many of these can be identified and discounted by their non-recurrence or lack of continuity with reflections from other pulses fired in close proximity. To this end the pulses are fired at uniformly-spaced intervals of only a few feet. The uniformity of speed of the ship 12 is also important since the web of paper 34 travels at uniform speed and it is ordinarily desirable to scale the record longitudinally of the web in units of length.

Another type of spurious echo is the so-called "double reflection." This is an echo which strikes a horizon, is reflected to the water surface, is reflected back to the horizon, and is then reflected to the hydrophone. Since the travelled path is approximately twice the length for a single reflection, the record will appear to indicate a second horizon following the profile of the actual horizon and at twice the depth thereof. Thus the observed record furnishes evidence to identify a double echo even though it appears to result from a continuous horizon.

It will be recognized by those familiar with echo sounding that although a reflecting horizon may be relatively smooth, its variations in depth produce recorded reflections from pulses at varying angles to the vertical. To produce a true profile or contour of the bottom from the recorded curve of reflections, it is common to employ a method in which arcs are struck on the record from conveniently spaced centers along a line corresponding to the water surface, these arcs being adjusted in radius to intersect the reflections. The arcs are continued so that the series from a single reflector are allowed to intersect each other. Then, a curve is drawn tangentially to these several arcs to represent the horizon. This method is also employed in the operation of the present invention, but its application is extended to include the contours of interfaces or horizons below the bottom as well. To be effective, this method relies heavily on the recording of many reflections from the same surface in very close, evenly spaced relationship. This improves the opportunity to correlate closely the reflections from one horizon and to distinguish reflections from one horizon over those from another, as the method presupposes that the arcs defining each horizon are struck only over the reflections emanating from it. This requirement is readily met by the present instrument.

As previously mentioned, the filter or filters are adjusted with a view to obtaining clear reflections of waves having frequencies low enough to penetrate to the horizons of interest. The multiple-filter apparatus of FIG. 3 permits simultaneous reception of reflections in a plurality of wave bands to secure a further advantage. This may be illustrated by an example in which the low frequency filter 36 produces a record consistently showing a certain number of reflections per pulse, for example three reflections. The first reflection evidently represents the bottom and the second and third apparently represent two sub-bottom horizons. When the high frequency filter 38 is substituted and adjusted to exclude frequencies low enough to penetrate the bottom, it is found that two reflections occur, of which the first represents the bottom and a second appears at the same depth as either the second or third reflection observed with the low frequency filter 36. Since it is known that this reflection is not from a sub-bottom horizon, it must be from a distant slope of the bottom. This interpretation may then be applied to the corresponding reflection on the low frequency record. This method may be employed by causing both filtered signals to record on each pulse, preferably on separate channels of a graphic recorder, or by causing the filtered signals to record on closely adjacent pulses so that substantially the same area is recorded through both filters.

It will be understood from the description above that the methods of the present invention are arranged to produce high resolution, for example less than 5 feet, in the location and measurement of sub-bottom strata. Vertical resolution is achieved by a high speed of recording and resolution between horizons is achieved by causing the pulses to be short.

As previously pointed out, horizontal resolution is achieved by sending pulses from closely adjacent positions, or in other words, at a high rate of repetition during relatively slow uniform movement of the source and detector. Thus the distance moved by the source 14 between successive shots is made less than the dimensions of the smallest irregularities in the horizon to be charted.

While the above description is based on the use of a spark discharge device for the source of elastic waves, other broad spectrum sources may also be used. These include, for example, a rifle discharged into the water and various forms of mechanical impact devices.

It will be further recognized that the instrument according to the present invention is adapted to represent, within each sweep of the web 34 in which the helix 28 records on the paper 34, all of the reflections of interest resulting from a single impulse. This impulse is arranged to occur at the beginning of a cycle of one or more sweeps and is relatively short in comparison with the time required for the helix to complete one revolution. The interpretation of the resulting data, therefore, characteristically involves a comparison of discrete, independent, closely-spaced observations resulting from different impulses.

*Pulse Timing*

Details of construction of a preferred form of surveying instrument for the practice of this invention are schematically shown in FIG. 4. The drum 26 is keyed to a shaft 46 which is in turn driven by a synchronous motor 48 through a gear speed reducer 50. The speed reducer is provided with magnetic clutches, a differential and gear shift mechanisms of conventional types to furnish a number of selectable drum speeds. Speed selection is effected by a multiposition switch in a speed control unit 52. The signal from an oscillator 53, the frequency of which is precisely controlled either by a tuning fork or by a crystal, is employed to power the motor 48. It will be understood that the selected drum speed determines the sweep time of the helix across the width of the web 34.

The motor 48 also drives a paper feed mechanism through a positive worm and gear drive, a paper speed control gear box 54 and a pair of friction rolls 56. At least three paper speeds are provided: one which advances the paper about the width of the recording trace per helix revolution, a second, somewhat slower speed which produces integration of successive echoes, and a third speed somewhat faster than the first which permits the unequivocal identification of the arrival time of single transient pulses.

Keyed to the shaft 46 are three commutators 58, 60 and 62. It will be understood that while commutators are shown, other equivalent means such as cam-operated switches can also be used. The commutator 58 is a quadrant commutator having four equal conductive segments connected to the respective outputs of a four-channel preamplifier 64 through a set of four quadrant selection keys 66. The signals received by the detector 18 are amplified by the amplifier 20 and sent to four filters 68 respectively connected to the amplifiers 64. The common ring on the commutator 58 is connected to a common recorder driver amplifier 70. This multi-channel arrangement is effective to divide the web 34 longitudinally into four strips of equal width, and actuation of the driver amplifier may be effected in any one or more of the quadrants. For multi-channel recording the filters are ordinarily adjusted to different frequency ranges and a pulse from the source 14 is sent out at the start of each quadrant. In effect, the result is to make four complete survey records differing in frequency selectively across the width of the web for purpose of correlation. If single channel recording is desired the key 66 for the particular filter 68 which is selected for use is closed and in addition, a set of four channel interconnecting keys 71 are closed, and a signal pulse from the source 14 is caused to occur once each revolution of the drum. It will be understood that two or three channels may also be utilized by closing other combinations of the keys 66 and 71.

The wave source 14 is triggered by a circuit 72 which receives impulses through series-connected commutators in timed relation to the drum 26. The source 14 preferably includes a condenser which is discharged rapidly to provide the energy for the spark, the duration of the spark being controllable by adjustment of the time constant of the discharge circuit. The commutators in the triggering circuit include the commutator 60 which is a quadrant commutator identical with the commutator 58, the commutator 62 and a commutator 74 keyed to a shaft 76 driven at one-twelfth the speed of the shaft 46 through a gear speed reducer 78. The commutator 60 determines the quadrant or quadrants in which impulses will occur through selective closure of keys 80. The commutator 62 has three sections, each of which has a conductive segment that begins at the leading edge of each quadrant and extends over an angle proportional to a selectable impulse gate duration. While the impulse duration of the illustrated spark source is ordinarily controllable by the condenser discharge time as mentioned above, the commutator 62 provides an alternative means especially suited to the use of other sources of elastic waves. A switch 82 controls the selection of the impulse gate duration. The sections of the commutator 74 are marked off to permit the impulses to occur once each revolution of the drum or in any desired combination of twelve successive drum revolutions. This latter selection is effected by means of a set of keys 84.

The recorder driver amplifier 70 has an output circuit to the helix 28 and straight edge 32 in series with a set of keys 86. These are associated with a commutator 88 identical with the commutator 74, and serve the purpose of permitting a recording to occur only during a selected combination of twelve successive drum revolutions.

From the foregoing description, it will be recognized that the method and apparatus of this invention are uniquely adapted to permit the surveying of sub-bottom strata in water-covered areas. While the invention has been described with reference to specific embodiments and methods of operation thereof, numerous variants of form, details of construction, arrangements of the parts and technical procedures will suggest themselves to one skilled in this art upon a reading of the foregoing specification. These may be adopted without departing from the spirit or scope of the invention.

Having thus described the invention, we claim:

1. The method of surveying and graphically charting the contours of interfaces between water-covered strata including contours lying at a substantial angle to the horizontal, which includes the steps of generating in the water substantially non-directional elastic wave pulses of short duration at a uniform rate of repetition from a source substantially at the water surface while moving the source horizontally at constant velocity, each pulse having a broad frequency content including frequencies high enough and low enough, respectively, to produce appreciable reflections from the bottom and the most remote interface of interest, receiving at a position constantly maintained in close proximity to the source those pulse waves that have been reflected from the interfaces substantially normal to the reflecting planes thereof including pulse waves reflected generally vertically and pulse waves reflected at a substantial angle to the vertical, the repetition rate of the pulses having an upper limit such that the reflected pulse waves from a given generated pulse are received from interfaces of interest before the next succeeding pulse is generated and a lower limit such that the distance moved by the source between successive generated pulses is less than the smallest horizontal dimension of a feature in an interface to be resolved, amplifying the received pulse waves and passing a selected bandwidth of frequencies thereof, and graphically indicating by marking on a time scale the intervals between each generated pulse and the passed reflected pulse waves which it produces, repeating the steps aforesaid for each successive generated pulse thereby graphically producing a second indication displaced on a distance scale normal to the time scale 2. The method according to claim 1 in which the selected bandwidth is adjusted substantially at a highest frequency region in which observable reflections are received from the most remote interface of interest.

3. The method according to claim 1 in which the elastic wave pulses are spark pulses.

4. The method according to claim 1 in which the duration of each pulse is substantially shorter than the travel time through any stratum to be separately identified.

5. The method according to claim 1 which permits discrimination between reflections from a given interface and side reflections from a less remote interface, wherein the repetition of the recited steps includes restriction of the passed reflection pulses to frequencies incapable of appreciable penetration of the strata intervening between said interfaces.

References Cited in the file of this patent

UNITED STATES PATENTS

| | | |
|---|---|---|
| 2,049,724 | Prescott | Aug. 4, 1936 |
| 2,167,536 | Suits | July 25, 1939 |
| 2,412,234 | Turner | Dec. 10, 1946 |
| 2,544,819 | Babb et al. | Mar. 13, 1951 |
| 2,599,245 | Finn | June 3, 1952 |
| 2,622,691 | Ording | Dec. 23, 1952 |
| 2,651,027 | Vogel | Sept. 1, 1953 |
| 2,866,512 | Padberg | Dec. 30, 1958 |
| 2,981,357 | Huckabay | Apr. 25, 1961 |
| 2,994,397 | Huckabay | Aug. 1, 1961 |

FOREIGN PATENTS

| | | |
|---|---|---|
| 777,836 | Great Britain | June 26, 1957 |

OTHER REFERENCES

Geophysics, vol. 17, issue 4, pages 721–728, October 1952.

Publication: "Navy Announces New Ocean Bottom Mining," The San Diego Union, April 12, 1953, page a–23.

Publication: "A Deep-Sea Seismic Reflection Profile," by C. B. Officer, Geophysics magazine, vol. 20, No. 2, April 1955, pages 270–281.